Figure 1:
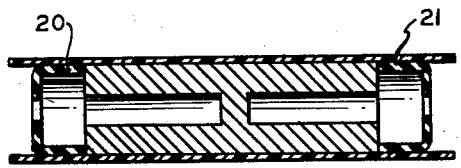

Jan. 12, 1965   L. S. LYNCH, JR., ET AL   3,165,575
INSULATED SPLICER WITH END SEALS
Filed Oct. 4, 1962

INVENTORS
LESLIE S. LYNCH, JR.
EDWARD L. ELDRIDGE
BY

ATTORNEY

3,165,575
INSULATED SPLICER WITH END SEALS
Leslie S. Lynch, Jr., Union, and Edward L. Eldridge, Warren Township, N.J., assignors to The Thomas & Betts Co., Elizabeth, N.J., a corporation of New Jersey
Filed Oct. 4, 1962, Ser. No. 228,339
5 Claims. (Cl. 174—84)

This invention relates to an insulated splicer of novel construction, for connection of conductors through a large range of sizes, on overhead primary distribution systems and the like, and for other uses as an insulated splicer. The device may be manufactured and preassembled efficiently at relatively low cost and readily applied at the point of use.

The drawings, illustrating procedures and devices useful in carrying out the invention, and the description below, are exemplary only of the invention, which shall be deemed to cover all other devices and procedures coming within the scope and purview of the appended claims.

Figure 2:
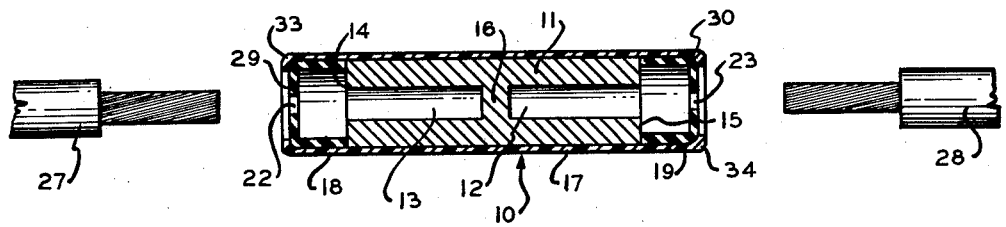
Figure 3:
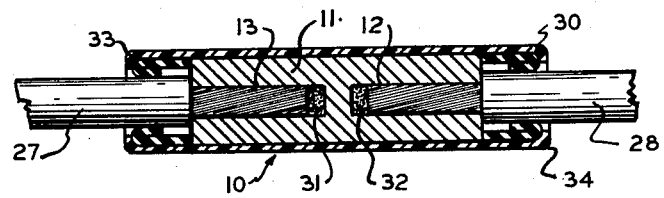
Figure 4:
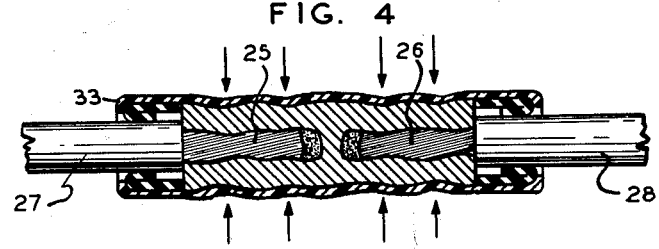

In the drawings, wherein similar reference characters indicate like parts:

FIG. 1 is a longitudinal sectional view of an insulated splicer embodying the invention, FIG. 2 is a similar view, showing conductors about to be inserted therein, FIG. 3 is a similar view, showing the conductors inserted into the splicer, and FIG. 4 is a similar view of the parts compressed to complete their assembly, as noted by the arrows.

As shown in the drawings, an insulated splicer 10 embodying this invention comprises an inner core block 11 of an electrically conductive material for example, aluminum, preferably compatible with the wires, cables or other conductors to be connected and preferably capable of elongation upon radial inward compression (as noted by the arrows, FIG. 4). The core block 11 is preferably of solid cross section, as shown, and is provided with axial recesses 12 and 13 extending inwardly of the opposite longitudinal ends 14, 15 of the block. The recesses 12, 13 terminate short of each other inwardly of the core block, to thus define a solid medial cross sectional wall 16 therein. A dielectric outer sheath 17 of any suitable plastic or other material is provided to preferably snugly medially receive the core block and extend substantially beyond the longitudinal ends thereof, as noted at 18, 19 in FIG. 2. The splicer 10 is designed to receive conductors such as indicated at 25 and 26 in the drawings, extending from insulating coverings, wrappers or sheaths 27, 28.

As shown in FIG. 1, in the initial assembly of the splicer parts, the core block 11 is received in dielectric outer sheath 17, and flexible sleeves or sealing bushings 20, 21 are inserted into the outer sheath 17 and against the ends 14, 15 of the core block 11. Bushings 20, 21 are preferably made of a relatively yieldable material substantially softer than the conductors 25, 26 and are provided with downturned ends 29, 30 and with medial openings 22, 23 in said downturned ends so that conductors 25, 26 may forcibly or snugly be passed therethrough and in sealing relation therewith. The inner ends of the recesses 12, 13 may receive sealant or oxygen-excluding filler or substance 31, 32. The longitudinal ends 33 and 34 (FIG. 1) of the outer sheath 17 are downturned or rolled as by heat, pressure or other means (FIG. 2) so as to confine the flexible sealing bushings 20, 21 intermediate said ends 33 and 34 and the core block ends 14, 15.

The conductors 25, 26 are (FIG. 3) inserted into the recesses 12 and 13 of the core block 11, with the insulating sheaths 27 and 28 of the conductors abutting the opposite longitudinal ends 14, 15 of the core block within the encircling bushings 20, 21. The assembly is then preferably positioned intermediate tools or dies, exerting a pressure force inwardly radially as noted by the arrows, FIG. 4, to interlock the parts. The core block 11 is capable of elongation and increase in length when radially compressed and therefore on compression elongates and presses against the bushings 20 and 21, which may be made of rubber or a rubbery material and are so proportioned as to initially snugly fit between the downturned ends 29, 30 (FIG. 2) of the dielectric outer sheath 17 and the longitudinal ends 14, 15 of the inner block 11; said sleeves 20, 21 expand radially when thus pressed, increasing their wall thickness, pressing tightly against the insulating covers, wrappers, or sheaths 27, 28 of the conductors 26, 27, effectively sealing them from the atmosphere. The inability of the flexible sleeves 20, 21 to move longitudinally results in an increase in their wall thickness which in turn exerts a force against the insulation of the cable thus effectively sealing the joint against the intrusion of foreign elements. The sealants 31, 32 entrapped in the compression operation (FIG. 4) exclude air and other ambient substances from the recesses 12, 13.

Having thus described our invention, what we claim as new and desire to secure by Letters Patent is:

1. An insulated splicer for electrically connecting and dielectrically shielding conductors extending from insulating covers, comprising an inner core block having recesses extending inwardly of the longitudinal ends thereof to receive said conductors, said core block being formed of conducting material and adapted to be longitudinally elongated under transverse compression, a tubular dielectric insulating sheath of substantially greater length than the core block, said core block being medially received within said sheath, flexible sealing means positioned against the longitudinal ends of the core block within the confines of said insulating sheath, said sealing means being axially deformable to increase the radial dimension thereof upon axial compression thereof, the longitudinal ends of said insulating sheath being turned down to confine the sealing means against said core block ends, the parts being so proportioned that upon insertion of the conductors within said recesses, the sealing means will be in peripheral contact with the insulating covers of said conductors, whereby upon transverse compression and deformation of said core block, said conductors will be crimped therein and said core block will elongate and apply an axial compressive force upon said sealing means to radially deform the same and tightly seal against said insulating covers and said insulating sheath to thereby effectively seal the conductors from the atmosphere.

2. An insulated splice and electrical connection comprising an inner core block having recesses extending inwardly of the longitudinal ends thereof, said core block being formed of conducting material and adapted to be longitudinally elongated under transverse compression, a tubular dielectric insulating sheath of substantially greater length than the core block, said core block being medially received within said sheath, flexible sealing means having an axial opening therein positioned against the longitudinal ends of the core block within the confines of said insulating sheath, said sealing means being axially deformable to increase the radial dimension thereof and to decrease the size of said axial opening therein upon axial compression thereof, the longitudinal ends of said insulating sheath being turned down to confine the sealing means against said core block ends, a pair of electrical conductors extending axially from insulating covers, said conductors being received within said core block recesses with said insulating covers being received within the axial openings of the sealing means and in peripheral contact with said sealing means, said core block being crimped about said conductors to secure the same therewithin, whereby the crimping and deformation of said core block will apply an axial compressive force upon said sealing means to radially deform the same and tightly seal against said insulating covers and said insulating sheath to thereby effectively seal the conductors from the atmosphere.

3. In an insulated splice and electrical connection as set forth in claim 1, said recesses in said core block terminating short of each other to thus define a solid medial wall in said block intermediate said recesses.

4. In an insulated splicer for electrically connecting and dielectrically shielding conductors extending from insulating covers as set forth in claim 2, the ends of the sealing means remote from the core block being downturned and an opening formed therein to snugly receive the insulating covers of the conductors.

5. In an insulated splice and electrical connection as set forth in claim 1, and further including sealants in the recesses of the core block.

References Cited in the file of this patent
UNITED STATES PATENTS

| | | |
|---|---|---|
| 2,316,267 | McLarn | Apr. 13, 1943 |
| 2,932,685 | Raila et al. | Apr. 12, 1960 |
| 3,019,284 | Matthysse | Jan. 30, 1962 |
| 3,036,147 | Wheaton et al. | May 22, 1962 |